United States Patent
Shiao et al.

(10) Patent No.: US 11,005,315 B2
(45) Date of Patent: May 11, 2021

(54) MANUFACTURING SYSTEM AND METHOD OF MANUFACTURE FOR STATOR ASSEMBLY OF ROTARY SYSTEM

(71) Applicant: Garrett Transportation I Inc., Torrance, CA (US)

(72) Inventors: Sunming Shiao, Cerritos, CA (US); Kour Thay Chau, Rancho Palo Verdes, CA (US); Leroy Allen Fizer, Huntington Beach, CA (US)

(73) Assignee: GARRETT TRANSPORTATION I INC, Torrance, CA (US)

( * ) Notice: Subject to any disclaimer, the term of this patent is extended or adjusted under 35 U.S.C. 154(b) by 476 days.

(21) Appl. No.: 16/045,143

(22) Filed: Jul. 25, 2018

(65) Prior Publication Data

US 2020/0036240 A1    Jan. 30, 2020

(51) Int. Cl.
*H02K 1/16* (2006.01)
*H02K 3/12* (2006.01)
*H02K 3/28* (2006.01)

(52) U.S. Cl.
CPC ............... *H02K 1/165* (2013.01); *H02K 3/12* (2013.01); *H02K 3/28* (2013.01)

(58) Field of Classification Search
CPC ............ H02K 1/165; H02K 3/12; H02K 3/28; H02K 1/148; H02K 15/095; H02K 15/022; H02K 15/02; F02B 39/10
See application file for complete search history.

(56) References Cited

U.S. PATENT DOCUMENTS

| | | | |
|---|---|---|---|
| 2001/0017501 A1* | 8/2001 | Suzuki | H02K 3/522 310/261.1 |
| 2002/0047462 A1 | 4/2002 | Mayer et al. | |
| 2002/0140312 A1 | 10/2002 | Ikeda et al. | |
| 2003/0030345 A1 | 2/2003 | Enomoto et al. | |

FOREIGN PATENT DOCUMENTS

FR    2995468 A1    3/2014

* cited by examiner

*Primary Examiner* — Mohamad A Musleh
(74) *Attorney, Agent, or Firm* — Lorenz & Kopf, LLP

(57) ABSTRACT

A method of manufacturing a stator assembly for an electrified rotary system includes attaching a first tooth and a second tooth to an inner support to define a first construction. The first tooth and the second tooth extend radially away from the inner support in the first construction. The method also includes attaching a winding about the first tooth of the first construction to define a second construction. Furthermore, the method includes applying, with a fixture, a preload at a joint between the inner support and the first tooth of the second construction. Moreover, the method includes attaching an outer support to a first outer radial end of the first tooth and to a second outer radial end of the second tooth while applying the preload to define a third construction.

20 Claims, 9 Drawing Sheets

US 11,005,315 B2

MANUFACTURING SYSTEM AND METHOD OF MANUFACTURE FOR STATOR ASSEMBLY OF ROTARY SYSTEM

TECHNICAL FIELD

The present disclosure generally relates to a stator assembly. More particularly, the present disclosure relates to a manufacturing system and a method of manufacture for a stator assembly of a rotary system, such as an e-charger of a vehicle engine system.

BACKGROUND

Rotary systems, such as electric motors and generators, typically include a stator assembly and a rotor assembly. The stator assembly can include electrically conductive windings that are wound about a stator stack. The rotary system may be included in various components, such as an electrically-driven compressor or e-charger for a vehicle engine system.

Conventional manufacturing methods for the stator assembly may present certain challenges. For example, forming the windings on the stator stack may be difficult, time consuming, and inefficient. Additionally, it may be necessary to perform some manufacturing steps manually, which negatively affects manufacturability.

BRIEF SUMMARY

In one embodiment, a method of manufacturing a stator assembly for an electrified rotary system is disclosed. The method includes attaching a first tooth and a second tooth to an inner support to define a first construction. The first tooth and the second tooth extend radially away from the inner support in the first construction. The method also includes attaching a winding about the first tooth of the first construction to define a second construction. Furthermore, the method includes applying, with a fixture, a preload at a joint between the inner support and the first tooth of the second construction. Moreover, the method includes attaching an outer support to a first outer radial end of the first tooth and to a second outer radial end of the second tooth while applying the preload to define a third construction.

In another embodiment, a manufacturing system for manufacture of a stator assembly for an electrified rotary system is disclosed. The manufacturing system includes at least one attachment system, a winding system, and a fixture. The at least one attachment system is configured to attach a first tooth and a second tooth to an inner support to form a first construction. The first tooth and the second tooth extend radially away from the inner support in the first construction. The winding system is configured to attach a winding about the first tooth of the first construction to form a second construction. The fixture is configured to apply a preload at a joint between the inner support and the first tooth of the second construction. The at least one attachment system is configured to attach an outer support to a first outer radial end of the first tooth and to a second outer radial end of the second tooth while applying the preload to define a third construction.

In an additional embodiment, a method of manufacturing an e-charger for an engine system is disclosed. The method includes attaching a first tooth and a second tooth to an inner support to define a first construction. The first tooth and the second tooth extend radially away from the inner support in the first construction. The method also includes attaching a winding about the first tooth of the first construction to define a second construction. Furthermore, the method includes applying, with a fixture, a radial preload at a joint between the inner support and the first tooth of the second construction. Moreover, the method includes attaching an outer support to a first outer radial end of the first tooth and to a second outer radial end of the second tooth while applying the preload to define a third construction. Additionally, the method includes installing the third construction as a stator assembly within an e-charger. The stator assembly is configured to drive a rotor assembly of the e-charger in selective rotation about an axis.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Broadly, example embodiments disclosed herein include an improved stator assembly for a rotary system, such as an electric motor. Manufacturing systems for manufacture of the stator assembly and methods for manufacturing the stator assembly are also disclosed.

In particular, systems and methods of manufacturing the stator assembly are disclosed that facilitate manufacturing, increase manufacturability, and improve manufacturing efficiency. The stator stack is assembled progressively from various parts to define various constructions. This increases manufacturing efficiency, for example, by allowing the windings to be provided on the stack in an efficient manner with high accuracy and repeatability. Furthermore, the stator assembly may include relatively few parts, such that manufacturing costs are relatively low. Moreover, the parts used in the assembly and/or tooling, fixtures, supports, etc. may be configured with features that increase manufacturing accuracy (e.g., building within manufacturing tolerances). For example, the parts may be preloaded during the assembly process, ensuring that the stator assembly is robust and provides highly efficient performance within the rotary system. Additionally, the stator assembly, the manufacturing systems, and the manufacturing methods of the present disclosure may include various features that enable automated and high-volume manufacture of the stator assembly and the rotary system.

Figure 1:
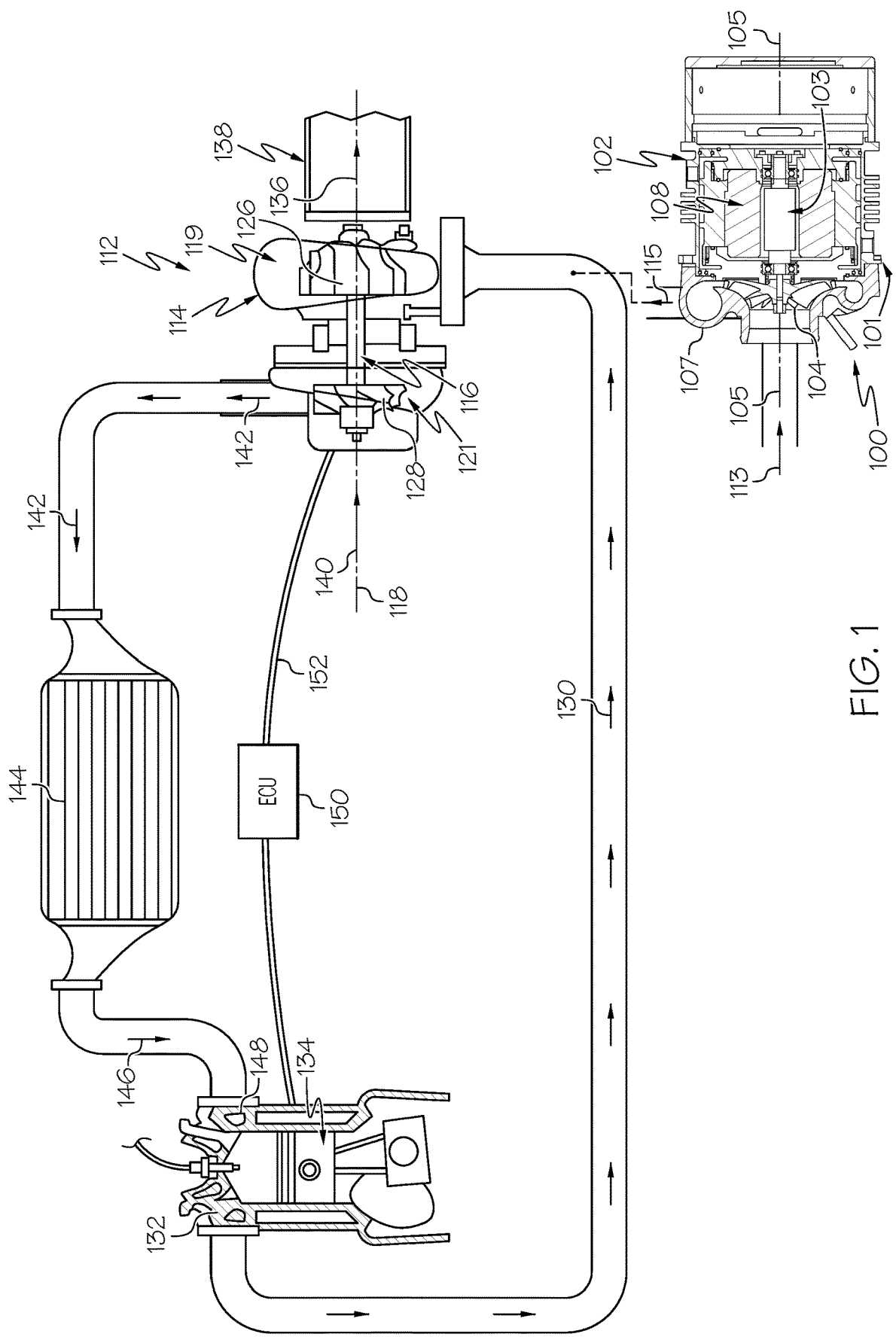
FIG. 1 is a schematic view of a vehicle engine system, which includes an electrified rotary system according to example embodiments of the present disclosure.

FIG. 1 is a schematic view of an example electrified rotary system 100 of the present disclosure. In some embodiments, the rotary system 100 may comprise an e-charger 102. Generally, the e-charger 102 may include a housing 101, a rotor assembly 103, and a stator assembly 108. The stator assembly 108 may be fixed and contained within the housing 101. The rotor assembly 103 may be received within the stator assembly 108 and may be supported for rotation about a rotation axis 105 within the housing 101 via one or more bearings.

A compressor wheel 104 may be fixedly mounted on the rotor assembly 103 and may be housed within a volute housing 107. Electric power supplied to the stator assembly 108 may drivingly rotate the rotor assembly 103 and the attached compressor wheel 104 about the axis 105. Accordingly, the compressor wheel 104 may receive an inlet fluid flow 113 and output a pressurized fluid stream 115 to a downstream component.

In some embodiments, the e-charger 102 may be provided within a vehicle. Additionally, in some embodiments, the e-charger 102 may be incorporated in a turbocharger system that includes a turbocharger 112.

The turbocharger 112 may be conventional and may include a turbocharger housing 114 and a rotor 116. The rotor 116 is configured to rotate within the turbocharger housing 114 about an axis of rotor rotation 118.

The turbocharger 112 includes a turbine section 119 configured to circumferentially receive a high-pressure and high-temperature exhaust gas stream 130 from an engine (e.g., from an exhaust manifold 132 of an internal combustion engine 134 or other type of engine). A turbine wheel 126 (and thus the rotor 116) is driven in rotation around the axis of rotor rotation 118 by the high-pressure exhaust gas stream 130, which becomes a lower-pressure exhaust gas stream 136 that is released into a downstream exhaust pipe 138.

The turbocharger 112 also includes a compressor section 121 with a compressor wheel 128 that is driven in rotation by the exhaust-gas driven turbine wheel 126. The compressor wheel 128 is configured to compress received input air 140 into a pressurized air stream 142. Due to the compression process, the pressurized air stream 142 is characterized by an increased temperature, over that of the input air 140.

The air stream 142 may be channeled through an air cooler 144 (i.e., an intercooler), such as a convectively cooled charge air cooler. The air cooler 144 may be configured to dissipate heat from the air stream 142, increasing its density. The resulting cooled and pressurized air stream 146 is channeled into an intake manifold 148 of the internal combustion engine 134, or alternatively, into a subsequent-stage, in-series compressor. The operation of the system may be controlled by an ECU 150 (engine control unit) that connects to the remainder of the system via communication connections 152.

As represented schematically in FIG. 1, the e-charger 102 may be disposed upstream of the turbocharger 112. For example, the pressurized fluid stream 115 output from the e-charger 102 may mix with the exhaust gas stream 130 and/or otherwise provide air input to the turbine section 119 to turn the turbine wheel 126 and, thus, rotate the compressor wheel 128 of the turbocharger 112. However, it will be appreciated that the e-charger 102 may be incorporated differently within the vehicle without departing from the scope of the present disclosure. For example, the e-charger 102 may be disposed downstream of the turbocharger 112 in some embodiments. In both cases, the e-charger 102 may increase air flow to the engine 134 and boost engine performance. The e-charger 102 may reduce transient time and turbo lag. The e-charger 102 may also provide benefits, such as reduced emissions, improved fuel efficiency, etc. Also, the size of the turbocharger 112 may be relatively small due to the inclusion of the e-charger 102.

Also, it will be appreciated that the e-charger 102 may be incorporated in a system that does not include a turbocharger 112. For example, in additional embodiments, the e-charger 102 may be configured to feed air to a fuel cell of a vehicle.

In addition, it will be appreciated that the term "e-charger" as used herein is to be interpreted broadly, for example, to include devices with an electrically driven compressor wheel regardless of where the e-charger is incorporated, the type of system in which the e-charger is incorporated, etc. It will also be appreciated that the e-charger of the present disclosure may also be referred to as an electrically driven compressor assembly. Also, the e-charger of the present disclosure may be configured as an electric supercharger, as a hybrid turbocharger, as an e-boost device, e-turbo, or other related component.

Although the stator assembly 108 is illustrated in FIG. 1 incorporated within an e-charger 102, it will be appreciated that the stator assembly 108 may be included within another electrified rotary system 100 without departing from the scope of the present disclosure. For example, the stator assembly 108 may be included in an electric generator, included in an electric motor for an actuating one part relative to another, or included in another electrified rotary system 100.

Figure 2:
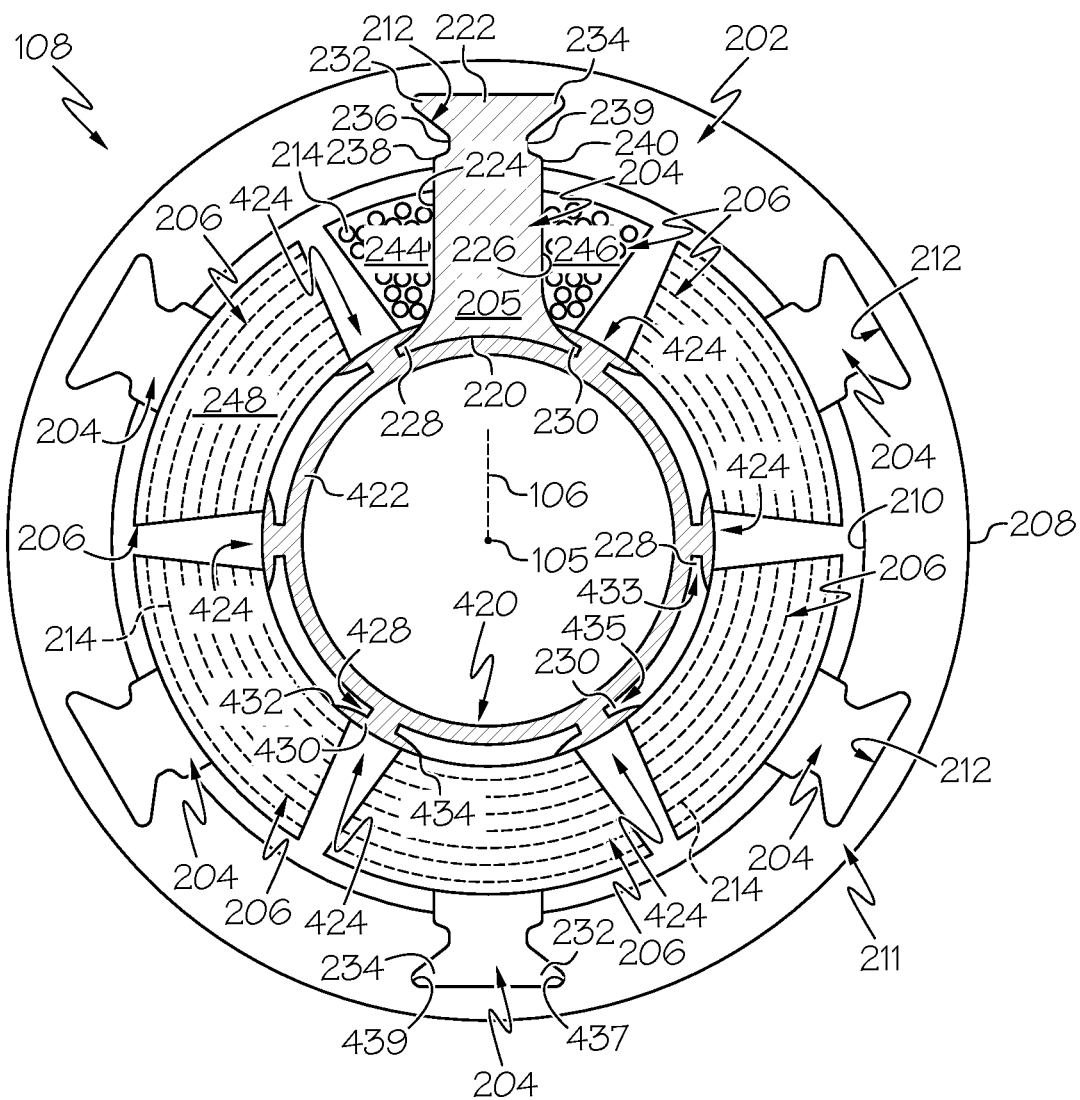
FIG. 2 is an end view of a stator assembly of the rotary system of FIG. 1 according to example embodiments.

Referring now to FIG. 2, the stator assembly 108 will be discussed in greater detail according to example embodiments. The stator assembly 108 of the e-charger 102 may include various features that facilitate manufacturing, increase manufacturability, and improve manufacturing efficiency. The stator assembly 108 may be at least partly manufactured using an automated system. Furthermore, the stator assembly 108 may include relatively few parts, such that manufacturing costs are relatively low.

The stator assembly 108 may generally include an outer support 202. The outer support 202 may be annular, hollow, and cylindrical. The outer support 202 may be centered about the axis 105. The outer support 202 may include an outer diameter surface 208 and an inner diameter surface 210. The inner diameter surface 210 may include a plurality of apertures 212. The apertures 212 may be elongate slots or channels that extend longitudinally along the axis 105. Also, the plurality of apertures 212 may be spaced substantially evenly about the circumference of the inner diameter surface 210. The outer support 202 may be formed of a strong and stiff material. For example, the outer support 202 may be formed of Si-Steel in some embodiments. The outer support 202 may be referred to as a "back iron" in some embodiments.

The stator assembly 108 may also generally include a plurality of teeth 204. In some embodiments, there may be six teeth 204 as shown in FIG. 2. However, it will be appreciated that the stator assembly 108 may include any suitable number of teeth without departing from the scope of the present disclosure. The teeth 204 may be fixedly attached to the outer support 202 as will be discussed.

At least one tooth 204 may include an inner radial end 220, an outer radial end 222, a first side 224, and a second side 226. Moreover, the tooth 204 may include a longitudinal end 205 that is cooperatively defined by the inner radial end 220, the outer radial end 222, the first side 224, and the second side 226. (Although hidden in FIG. 2, the tooth 204 may further include another longitudinal end that is opposite the end 205 that is shown.) The tooth 204 may also include a first flange 228 at the transition between the inner radial end 220 and the first side 224. Likewise, the tooth 204 may include a second flange 230 at the transition between the inner radial end 220 and the second side 226. The inner radial end 220 may be concavely contoured between the first flange 228 and the second flange 230. Additionally, the tooth 204 may include a third flange 232 at the transition between the outer radial end 222 and the first side 224. Likewise, the tooth 204 may include a fourth flange 234 at the transition between the outer radial end 222 and the second side 226. Furthermore, the first side 224 of the tooth 204 may include a first notch 236 that defines a first step 238, and the second side 226 of the tooth 204 may include a second notch 239 that defines a second step 240. The cross-sectional profile (taken perpendicular to the axis 105) may be substantially constant along the longitudinal length of the tooth 204. Also, in some embodiments, each of the teeth 204 of the stator assembly 108 may be substantially identical.

In some embodiments, the teeth 204 may be formed of a strong and stiff material. For example, the teeth 204 may be formed of Si-Steel in some embodiments.

The outer radial ends 222 of the teeth 204 may be fixedly attached to the outer support 202. For example, the outer radial ends 222 may be received within respective ones of the apertures 212 of the outer support 202. As such, the teeth 204 may project radially inward toward the axis 105 from the inner diameter surface 210 of the outer support 202. In some embodiments, the apertures 212 are shaped complimentary (i.e., inverse) to the tooth 204 such that the outer support 202 abuts and mates against the third and fourth flanges 232, 234, the first and second notches 236, 239, and the first and second steps 238, 240 of the tooth 204. In other words, the third flange 232 may be received in a first undercut channel 437 of the outer support 202. Likewise, the fourth flange 234 may be received in a second undercut channel 439 of the outer support 202. Accordingly, the teeth 204 may be "interference fit" within the outer support 202 to limit radial movement due to interference between the third and fourth flanges 232, 234 and the surrounding portions of the outer support 202. Radial movement may be limited as well due to interference between the steps 238, 240 and the surrounding portions of the outer support 202.

Moreover, in some embodiments, at least one tooth 204 may be integrally attached to the outer support 202. For example, the tooth 204 may be welded to the outer support 202. The tooth 204 and the outer support 202 may be spot-welded together. The outer support 202 and the tooth 204 may be formed of the same material (Si-Steel) in some embodiments to facilitate the welding process. Those having ordinary skill in the art will appreciate that, during the welding process, material of the outer support 202 and tooth 204 may melt, pressure may be applied, and the materials may fuse together to integrally attach the two parts. It will be appreciated, however, that the teeth 204 may be attached to the outer support 202 in a different manner without departing from the scope of the present disclosure. For example, in additional embodiments, at least one tooth 204 is attached to the outer support 202 via a brazing process.

The stator assembly 108 may further include an inner support 420. As shown in FIG. 2, the inner support 420 may be annular and may include an inner ring 422 and a plurality of retainer projections 424. The retainer projections 424 may be integrally connected to the inner ring 422 and may project radially away therefrom. Also, the retainer projections 424 may be spaced substantially evenly in the circumferential direction about the inner ring 422. In the illustrated embodiment, there are six retainer projections 424; however, there may be any suitable number of retainer projections 424 without departing from the scope of the present disclosure. In some embodiments, the retainer projections 424 may include a head 430 and a neck 428 that attaches the head 430 to the inner ring 422 at a radial distance. The head 430 may also include a first flange 432 and a second flange 434 that extend in opposite tangential directions from the respective neck 428. Neighboring pairs of the retainer projections 424 may define a first undercut 433 and a second undercut 435 that oppose each other. In some embodiments, the inner support 420 may be a unitary, one-piece member. Also, the inner support 420 may be formed from a material with a relatively high stiffness, such as steel.

At least one tooth 204 may be received by an aperture of the inner support 420 to attach the tooth 204 and the inner support 420. For example, the first flange 228 of the tooth 204 may be received within the first undercut 433 of the inner support 420, and the second flange 230 of the tooth 204 may be received within the second undercut 435 of the inner support. In some embodiments, the inner support 420, the plurality of teeth 204, and the outer support 202 may collectively define a stator stack 211 of the stator assembly 108.

The stator assembly 108 may further include a plurality of windings 206. The windings 206 may comprise at least one conductive wire 214 that is wound about a respective one of the teeth 204. The windings 206 may be wound over the tooth on the first side 224, the longitudinal end 205, the second side 226, and the hidden end opposite the end 205. More specifically, at least one winding 206 may include a continuous segment of wire 214 that extends continuously and uninterrupted from the first side 224, across the longitudinal end 205, to the second side 226, across the hidden longitudinal end opposite end 205, and back to the first side 224. In other words, the wire 214 may be wound continuously around the tooth 205 about a radial axis 106. The winding 206 may include a plurality of passes of wire 214, which may layer over each other. Thus, the winding 206 may include a first portion 244, which includes segments of the wire 214 that are layered over the first side 224 of the respective tooth 204. Additionally, the winding 206 may include a second portion 246, which includes segments of the wire 214 that are layered over the second side 226 of the tooth 204. Furthermore, the winding 206 may include end portions 248, one of which is layered over the end 205 and the other being layered over the opposing end of the tooth 204. It will be appreciated that a single, continuous wire 214 may define the first portion 244, the second portion 246, and the end portions 248. (In FIG. 2, one end portion 248 of one winding 206 is hidden to reveal the longitudinal end 205 of the tooth 204 while the others are illustrated intact.)

Figure 3:
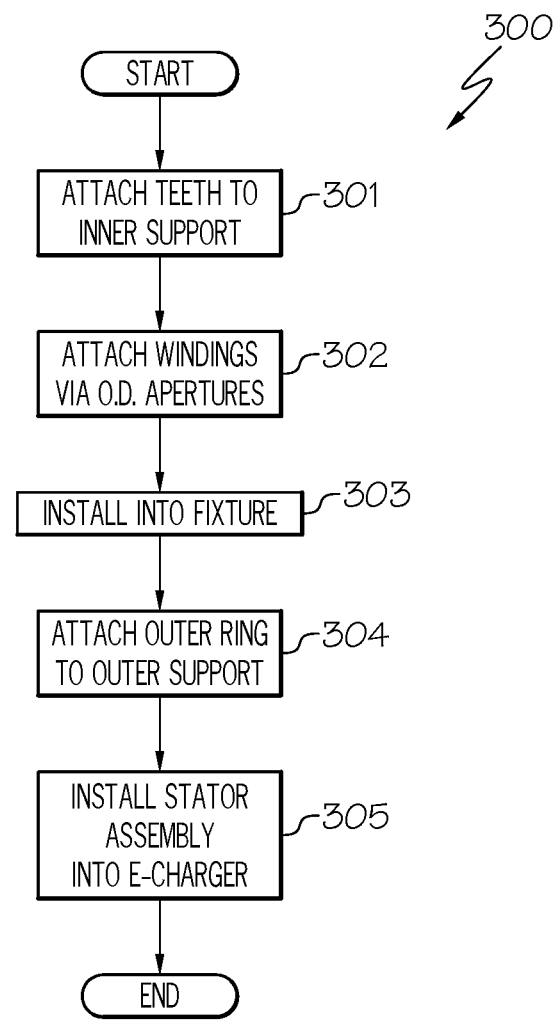
FIG. 3 is a flowchart illustrating a method of manufacturing the stator assembly of FIG. 2 according to example embodiments.

Referring now to FIG. 3, a method 300 of manufacturing the stator assembly 108 is illustrated. The method 300 of FIG. 3 may be performed using a manufacturing system 400 illustrated schematically in FIGS. 4-9. In some embodiments, the method 300 may be at least partly automated using the manufacturing system 400. To this end, the manufacturing system 400 may include various components that enable automation. For example, the manufacturing system 400 may include a controller 402, a conveyor system 401, at least one attachment system 406, a winding system 408, and an actuator system 404.

Embodiments of the method 300 and the manufacturing system 400 may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the manufacturing system 400 described herein is merely one exemplary embodiment of the present disclosure. Additionally, conventional techniques related to signal processing, data transmission, signaling, control, and other functional aspects of the systems (and the individual operating components of the systems) may not be described in detail herein for brevity. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

In some embodiments, the controller 402 may be a computerized system with hardware, software, firmware, electronic control components, processing logic, and/or a processor device 403. The processor device 403 may comprise an application specific integrated circuit (ASIC), an electronic circuit, a processor (shared, dedicated, or group) and memory that executes one or more software or firmware programs, a combinational logic circuit, and/or other suitable components that provide the described functionality.

The controller 402 may be configured as a computing device with associated processor devices and memory architectures, as a hard-wired computing circuit (or circuits), as a programmable circuit, as a hydraulic, electrical or electro-hydraulic controller, or otherwise. As such, the controller 402 may be configured to execute various computational and control functionality with respect to the other components of the manufacturing system 400 and the manufactured parts. In some embodiments, the controller 402 may be configured to receive input signals in various formats (e.g., as hydraulic signals, voltage signals, current signals, and so on), and to output command signals in various formats (e.g., as hydraulic signals, voltage signals, current signals, mechanical movements, and so on).

The processor 403 of the controller 402 may be in electronic, hydraulic, mechanical, or other communication with various other systems or devices of the manufacturing system 400. For example, the controller 402 may be in electronic or hydraulic communication with various actuators, sensors, and other devices of the manufacturing system 400, including various devices associated with the actuator system 404, the conveyor system 401, the attachment system 406, and the winding system 408. The controller 402 may communicate with these and/or other systems or devices (including other controllers) in various known ways, including via a CAN bus (not shown), via wireless means, or otherwise.

The conveyor system 401 may include various components that convey parts in a selective and automated manner to predetermined locations within a work area. The conveyor system 401 may include various robotic, articulating arms. The conveyor system 401 may include conveyor belts that translate the parts linearly along an assembly line. The conveyor system 401 may include other devices for moving the parts from one location (e.g., a first work station) to another location (e.g., a second work station).

Furthermore, the attachment system 406 may include one or more machines, handling devices, etc. for attaching two or more parts together. For example, the attachment system 406 may include a press (e.g., a hydraulic press) with opposing dies used to press-fit and fixedly attach the parts together as will be discussed. The dies of the attachment system 406 may then separate, the assembled part may be removed, and the pressing process may be repeated to make more assemblies. In additional embodiments, the attachment system 406 may include a shrink-fit system configured to insert one member within another. In these embodiments: 1) the attachment system 406 may shrink one member in a radial direction (e.g., by exposing the member to extreme cold) and may expand an aperture of another member in the radial direction (by exposure to extreme heat); 2) the shrunken member may be inserted into the expanded aperture of the other; and 3) the parts may adjust to room temperature such that the parts become fixedly attached to each other. Thus, the attachment system 406 may selectively adjust the temperature of the parts to attachment; however, in other embodiments, the attachment system 406 of the present disclosure may be used to attach room-temperature parts together.

Additionally, the winding system 408 may support a bulk amount of the wire 214 (FIG. 2). The winding system 408 may also include an articulating support and/or one or more articulating arms that may move the wire 214 from the bulk collection and around the individual teeth 204 to form the windings 206 of the stator assembly 108.

The actuator system 404 may be configured to actuate one or more parts of the conveyor system 401, the attachment system 406, and/or the winder system 408. The actuator system 404 may include separate actuators for each of the conveyor system 401, the attachment system 406, and the winder system 408 as shown; however, it will be appreciated that the actuator system 404 may be configured differently without departing from the scope of the present disclosure. The actuator system 404 may include one or more hydraulic actuators, pneumatic actuators, electric actuators, or otherwise. These actuators may be operatively connected to the controller 402 and may communicate therewith, for example, to receive control commands from the processor 403, to provide feedback to the processor 403 for closed-loop control, etc.

Figure 4:
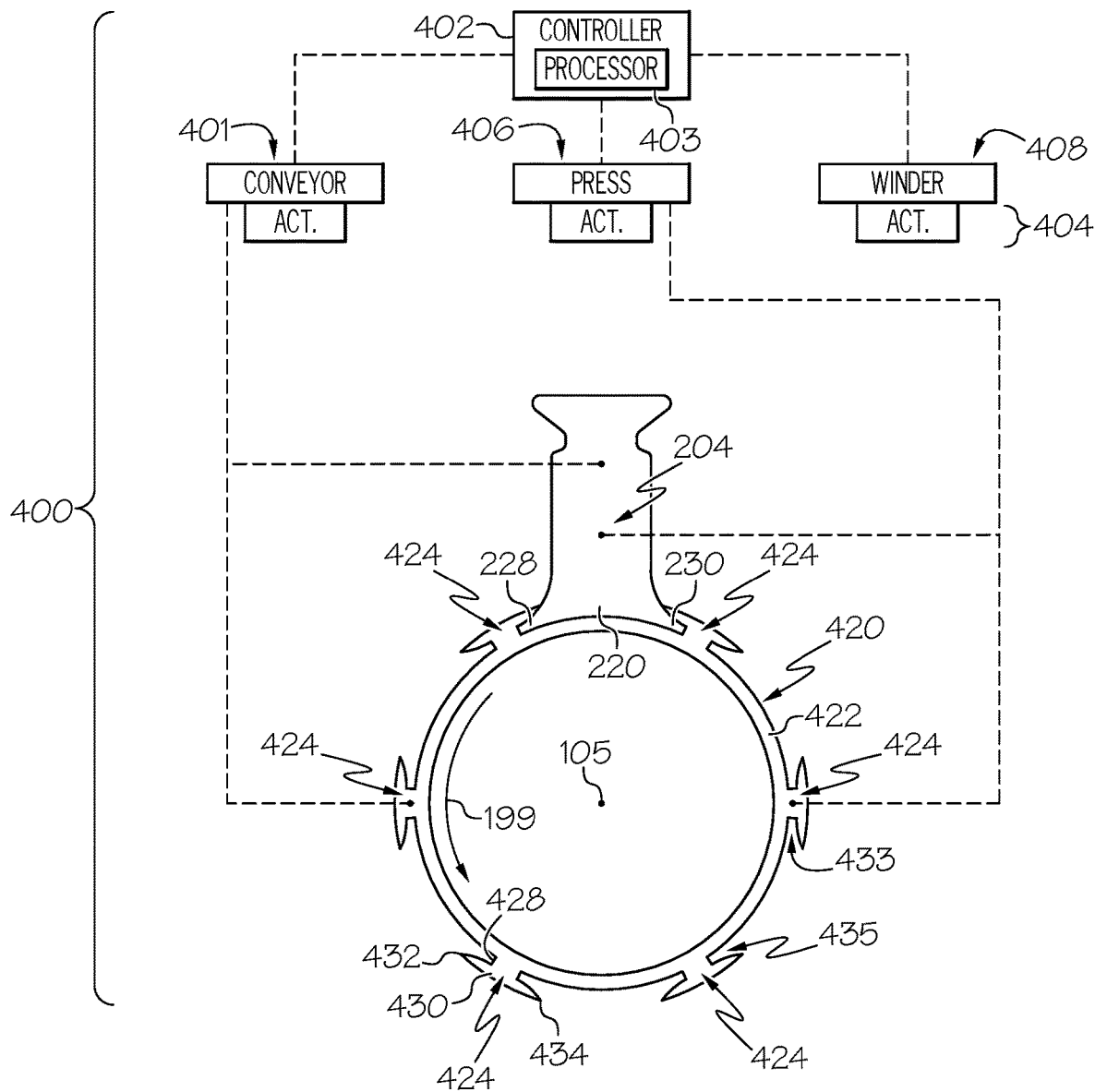
FIG. 4 is a schematic view of a manufacturing system according to example embodiments of the present disclosure shown manufacturing a first construction used in the manufacture of the stator assembly of FIG. 2.

As shown in FIGS. 3 and 4, the method 300 may begin at 301, in which the teeth 204 of the stator assembly 108 are attached to the inner support 420. More specifically, in some embodiments, at 301 of the method 300, the processor 403 may generate a control command that is received by the actuator of the conveyor system 401, and the conveyor system 401 may, in turn, convey the teeth 204 and the inner support 420 between dies of the attachment system 406. Then, the attachment system 406 may receive control signals from the controller 402, causing it to move the dies together and press-fit the tooth 204 to the inner support 420.

Specifically, the inner radial end 220 of the tooth 204 may be pressed into and received between a neighboring pair of the retainer projections 424. The tooth 204 may move substantially parallel to the axis 105 as it is press-fit into attachment with the inner support 420. Once attached, the first flange 228 of the tooth 204 may be secured (e.g., by the force of friction) between the first flange 432 and neck 428 of one of the projections 424 and the inner ring 422. The second flange 230 of the tooth 204 may be secured between the second flange 434 and neck 428 of the neighboring projection 424 and the inner ring 422. The inner radial end 220 may also mate against the outer diameter contour of the inner support 420.

Figure 5:
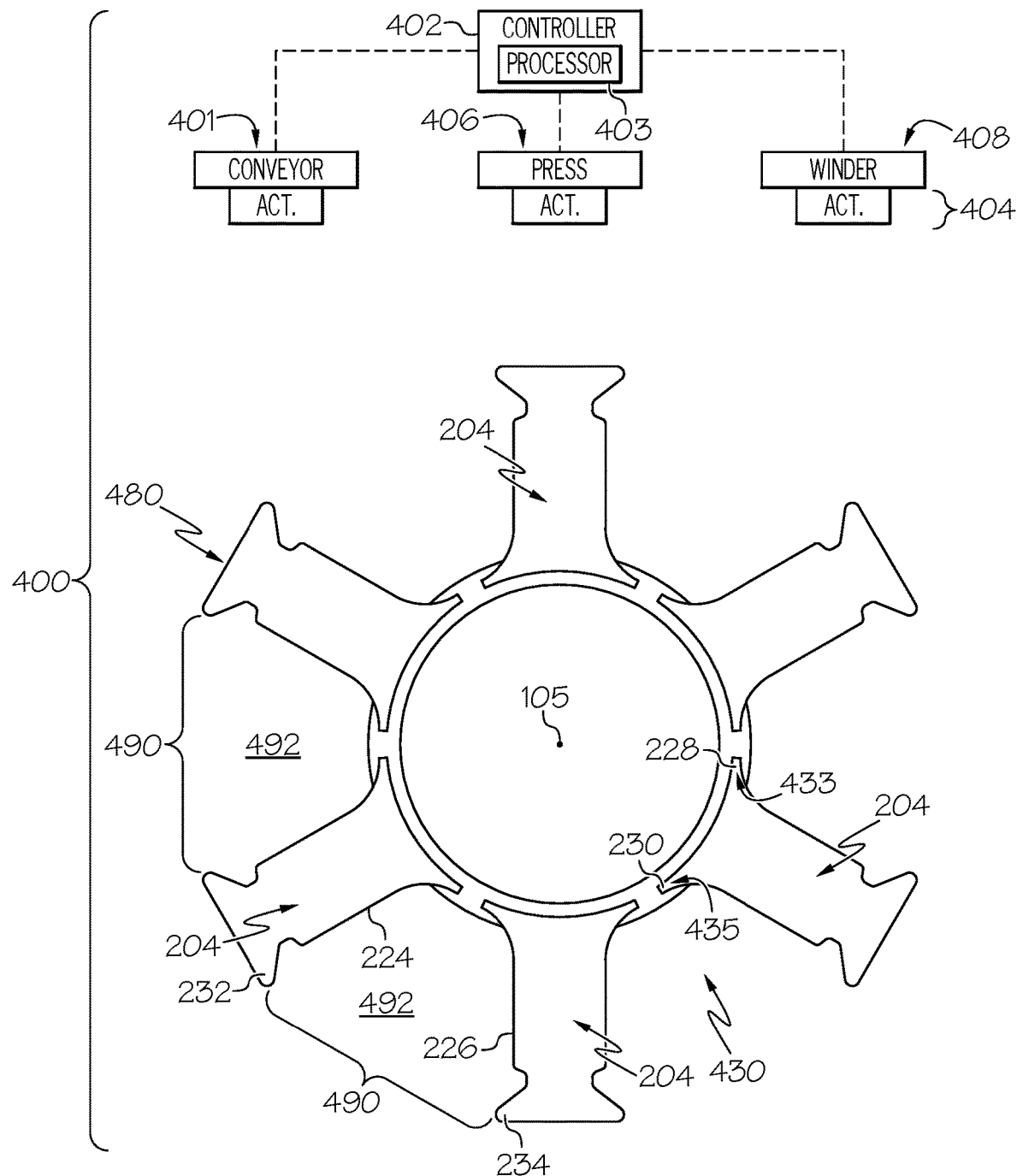
FIG. 5 is an end view of the first construction formed with the manufacturing system of FIG. 4.

This process may be repeated for the other teeth 204 as shown in FIG. 5. In some embodiments, the conveyor system 401 may rotate the assembly about the axis 105 as represented by arrow 199 during attachment of the additional teeth 204. The teeth 204 may be attached in sequence. In other embodiments, the two or more teeth 204 (e.g., each of the teeth 204) may be attached to the inner ring 422 substantially simultaneously to decrease manufacturing time.

As shown in FIG. 5, a first construction 480 may be formed according to 301 of the method 300. The first construction 480 may be collectively defined by the plurality of teeth 204 and the inner support 420. The teeth 204 may extend radially from the inner support 420 with outer diameter openings 490 defined between neighboring pairs of the teeth 204. The openings 490 may be defined in the circumferential direction between the third flange 232 of one tooth 204 and the opposing fourth flange 234 of the neighboring tooth 204. An inter-tooth space 492 may extend inward radially from the outer diameter opening 490 and may be defined between the first side 224 of one tooth 204 and the opposing second side 226 of the neighboring tooth 204.

This first construction 480 provides various advantages for the manufacturing method 300. The openings 490 may provide convenient access for winding the wire 214 about the teeth 204 when installing the windings 206. Additionally, the first construction 480 may be robust, stiff, and may be constructed to relatively high tolerances, thus ensuring that the stator assembly 108 is ultimately well-constructed.

Figure 6:
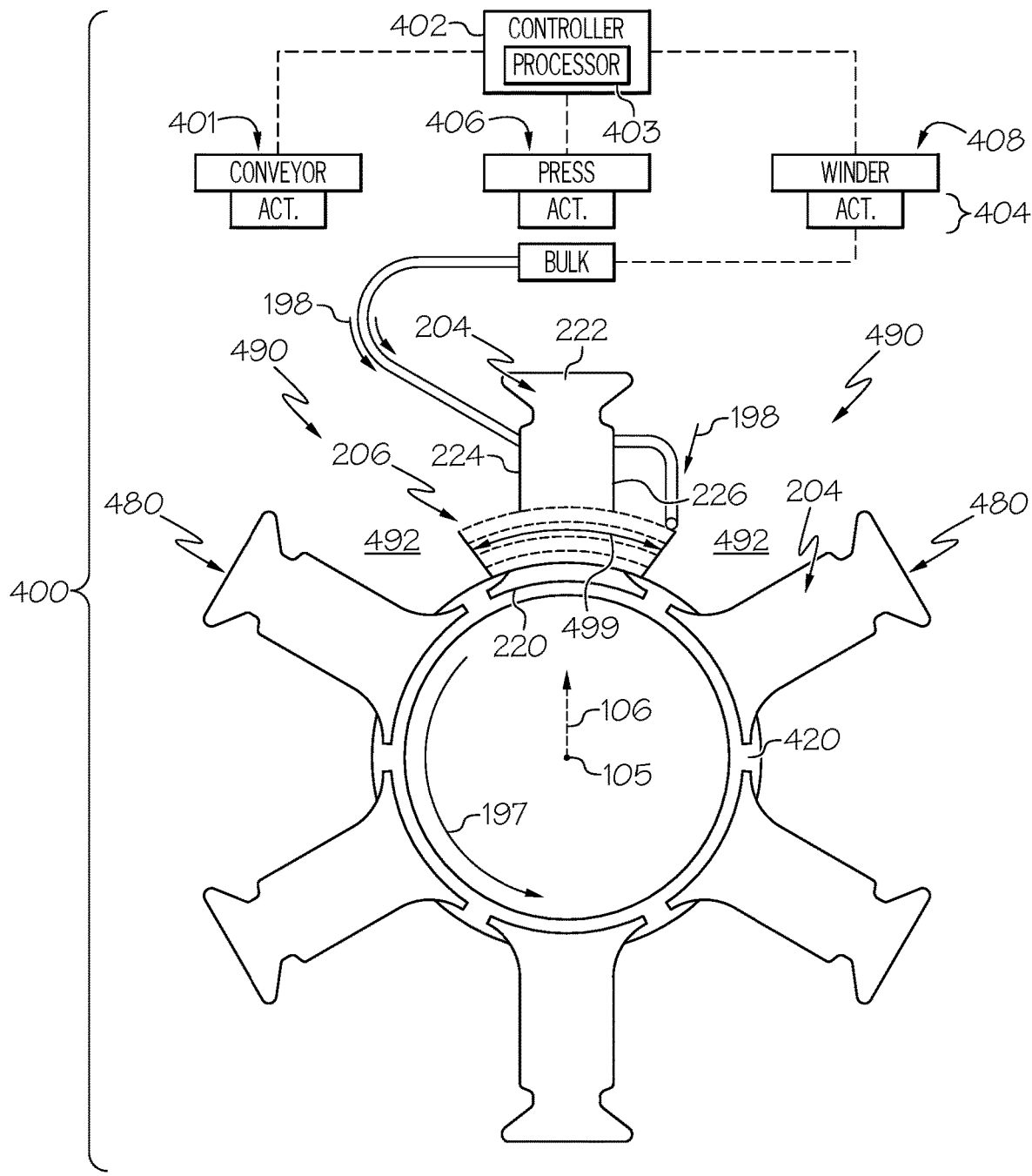
FIG. 6 is a schematic view of the manufacturing system shown manufacturing a second construction from the first construction of FIG. 5.

Referring now to FIGS. 3 and 6, the method 300 may continue at 302. At 302, the windings 206 may be attached. As shown in FIG. 6, the processor 403 may generate a control command that is received by the actuator of the winding system 408, and the winding system 408 may, in turn, wrap the wire 214 around the teeth 204 of the first construction 480. The wire 214 may be repeatedly wrapped about the radial axis 106, from the first side 224, across the longitudinal end 205, across the second side 226, across the longitudinal end opposite the end 205, and back to the first side 224. The wire 214 may be wrapped about the tooth 204 proximate the inner radial end 220 initially, and the winding 206 may be progressively formed outward in the radial direction from the inner radial end 220 to the outer radial end 222. In some embodiments, the winding 206 may be shaped such that a width 499 tapers and increases gradually in the radial direction from the inner radial end 220 to the outer radial end 222.

As shown, the outer diameter openings 490 of the first construction 480 may provide access for winding the wire 214 about the teeth 204. Specifically, the wire 214 may be fed by the winding system 408 radially inward into the inter-tooth space 492 via the outer diameter opening 490 as indicated by arrows 198. The winding system 408 may move the wire 214 from the first side 224 of the tooth 204 to the second side 226 via the outer diameter openings 490. It will be appreciated that the outer diameter openings 490 facilitate construction of the windings 206 because they are relatively wide and highly accessible.

Figure 7:
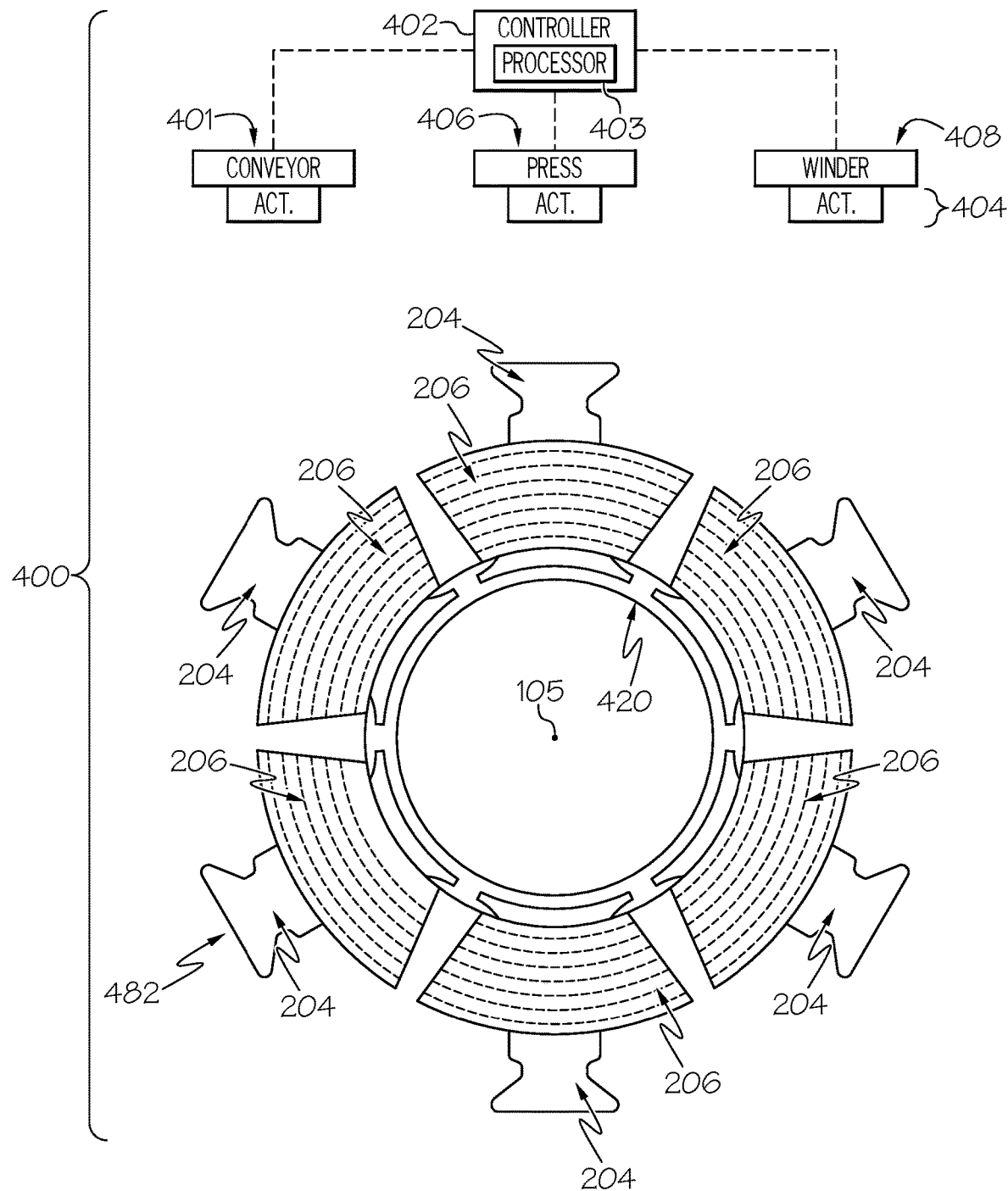
FIG. 7 is an end view of the second construction.

The winding process may be repeated for the other teeth 204 as shown in FIG. 7. The conveyor system 401 may rotate the assembly about the axis 105 during formation of the windings 206 as represented by arrow 197. In some embodiments, the different windings 206 may be formed in sequence. In other embodiments, two or more windings 206 (e.g., each of the teeth 204) may be formed substantially simultaneously to decrease manufacturing time.

As shown in FIG. 7, a second construction 482 may be formed according to 302 of the method 300. The second construction 482 may be collectively defined by the plurality of teeth 204, the inner support 420, and the plurality of windings 206. This second construction 482 may provide various advantages for the manufacturing method 300. The second construction 482 may be robust, stiff, and may be constructed to relatively high tolerances, thus ensuring that the stator assembly 108 is ultimately well-constructed.

Figure 8:
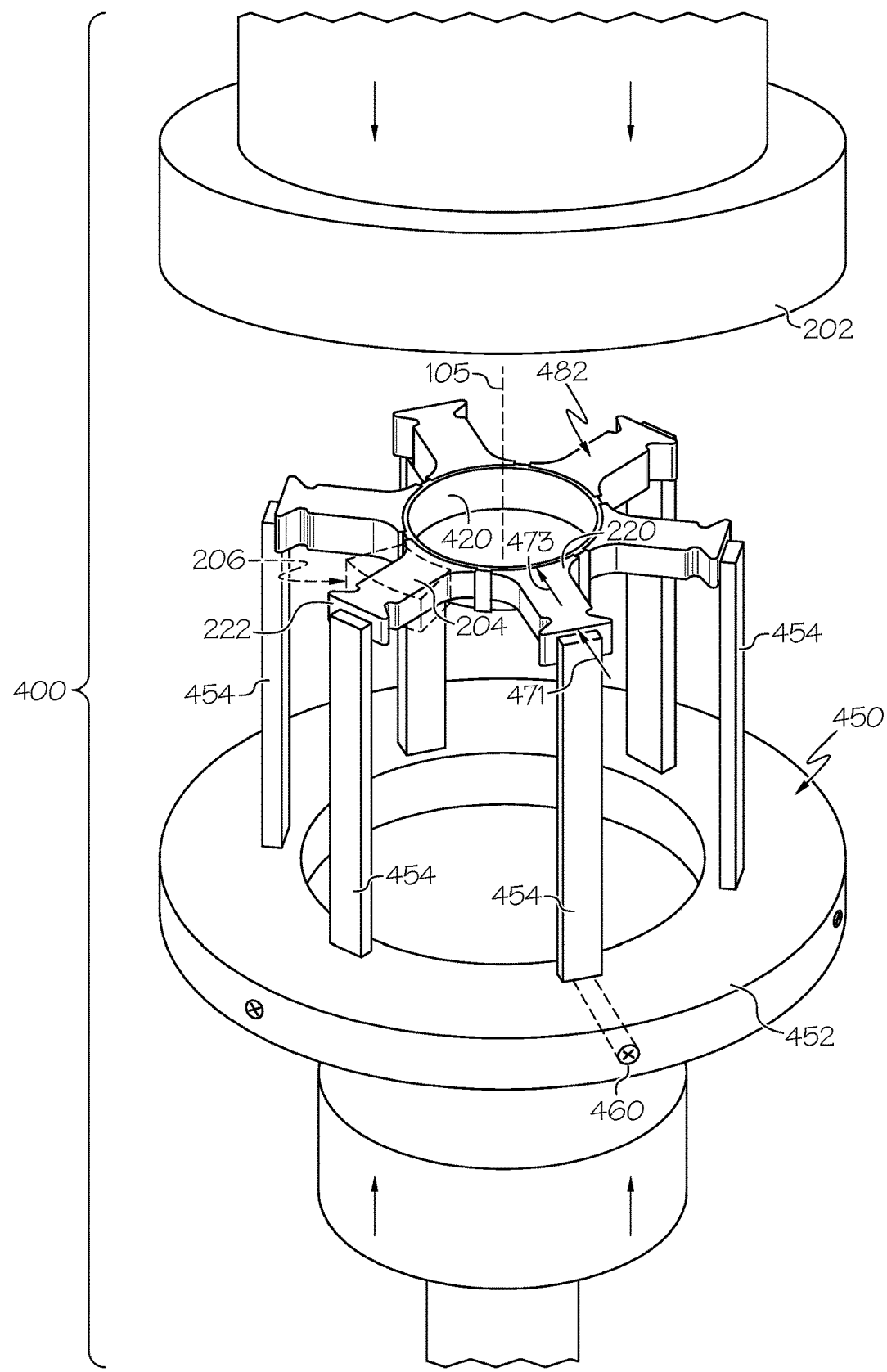
FIG. 8 is a perspective view of a fixture of the manufacturing system and an assembly system shown manufacturing the stator assembly of FIG. 2 from the second construction of FIG. 7.

Next, the method 300 may continue at 303 as shown in FIGS. 3, 5, and 8. At 303, the second construction 482 may be supported within a fixture 450 for applying a preload to the second construction 482. More specifically, the processor 403 may generate a control command that is received by the actuator of the conveyor system 401, and the conveyor system 401 may, in turn, convey the second construction 482 into the fixture 450 as shown in FIG. 8. The fixture 450 may include a base 452 and a plurality of engagement members 454. The base 452 may be ring shaped and centered about the axis 105. The engagement members 454 may be elongate members that are attached at one end to the base and that extend along the axis 105 therefrom. The engagement members 454 may be configured to engage the second construction 482. (The windings 206 of the second construction 482 are hidden in FIG. 8 for clarity.) In some embodiments, the engagement members 454 may engage the outer radial ends 222 of the teeth 204. The engagement members 454 may resiliently bend to apply a radially inward force to the teeth 204 as represented by arrow 471. The teeth 204 may, as a result, apply an inward, radial load 473 to the outer diameter surface of the inner support 420. Thus, the fixture 450 may apply a preload at the joint between the inner diameter end 220 of the tooth 204 and the outer diameter surface of the inner support 420.

In some embodiments, the fixture 450 may further include an adjustment member 460. The adjustment member 460 may be a set screw in some embodiments that is threadably engaged to the base 452 and that threadably advances in either direction, for example, to selectively vary the attachment of the engagement members 454 and the base 452. In some embodiments, the adjustment member 460 may be adjusted to make the engagement member 454 more stiff relative to the base 452 or vice versa. In some embodiments, the adjustment member 460 may be adjusted to vary the preload applied by the fixture 450 to the second construction 482.

Figure 9:
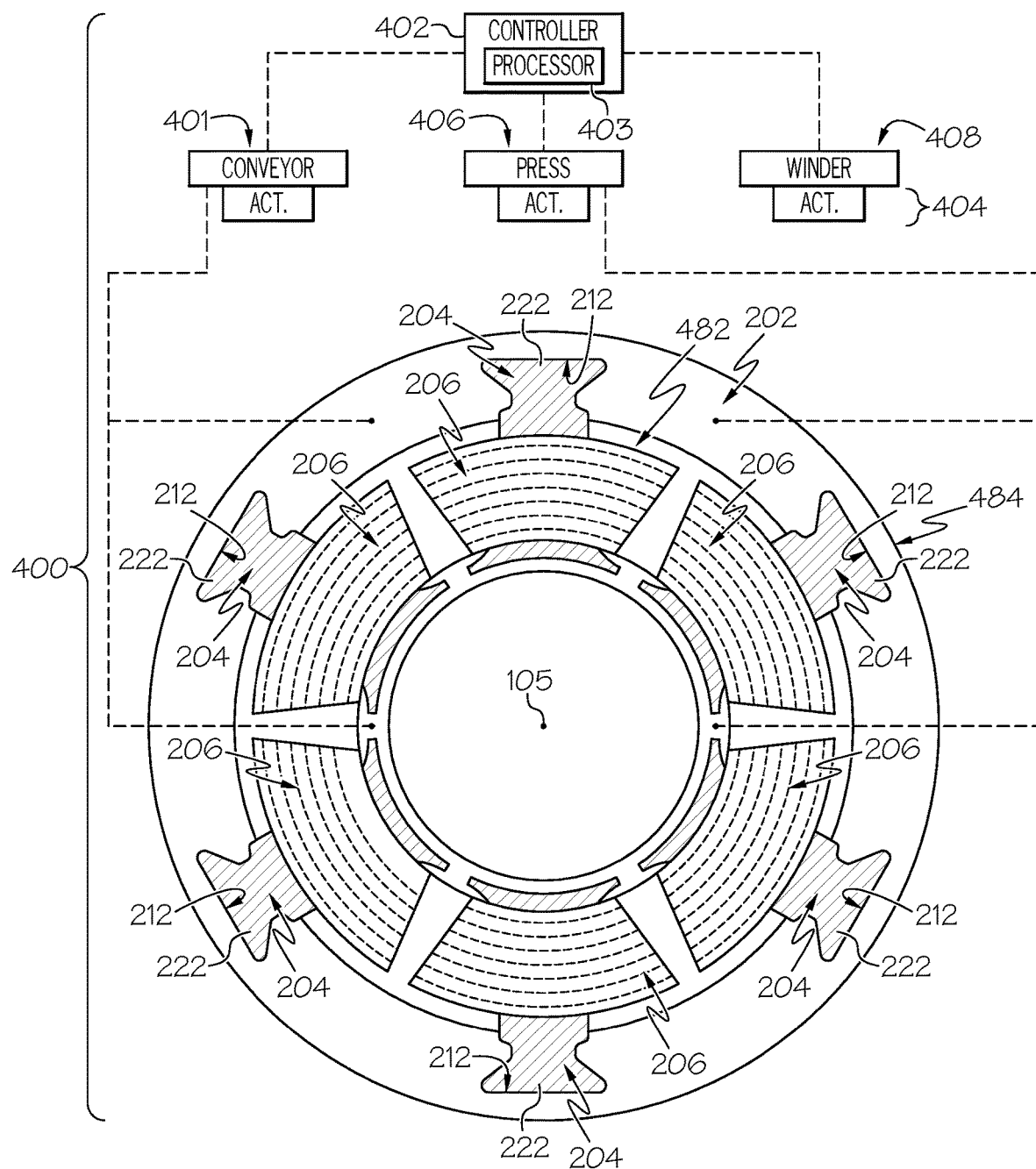
FIG. 9 is an end view of the stator assembly according to example embodiments of the present disclosure.

The method may continue at 304 as shown in FIG. 3. At 304, the outer support 202 may be attached to the second construction 482. More specifically, as shown in FIG. 8, the attachment system 406 may receive control signals from the controller 402, causing it to move the dies together and press-fit the outer support 202 to the second construction 482. As shown in FIG. 9, the outer support 202 may be pressed onto the outer radial ends 222 of the teeth 204 such that the outer radial ends 222 are received in the apertures 212 of the outer support 202 as discussed above. The outer support 202 may move substantially parallel to the axis 105 as it is press-fit to the second construction 482. Once attached, the outer diameter openings 490 may be closed off (in the radial direction) by the outer support 202 over the plurality of windings 206.

In some embodiments, the fixture 450 may maintain the applied preload while attaching the outer support 202. For example, the fixture 450 may hold the second construction 482 and apply the preload while one die of the attachment system 406 moves along the axis 105 through an opening in the base 452. This die may support the second construction 482 as an opposing die supports the outer support 202 and presses the outer support 202 into attachment with the teeth 204.

As shown in FIG. 9, a third construction 484 may be formed according to 304 of the method 300. The third construction 484 may be collectively defined by the plurality of teeth 204, the inner support 420, the plurality of windings 206, and the outer support 202. The preload may be maintained at the joint between the teeth 204 and the inner support 420 in the third construction 484. The third construction 484 may provide various advantages for the manufacturing method 300. The third construction 484 may be robust, stiff, and may be constructed to relatively high tolerances, thus ensuring that the stator assembly 108 is ultimately well-constructed.

Subsequently, the method 300 may continue at 305 as shown in FIG. 3. At 305, the processor 403 may generate a control command that is received by the actuator of the conveyor system 401, and the conveyor system 401 may, in turn, convey the third construction 484 and assemble the third construction 484 into an e-charger 102, such as the e-charger 102 of FIG. 1. For example, at 305 of the method 300, the rotor assembly 103 may be installed within the stator assembly 108 and both may be encased and supported within the housing 101. Then, the method 300 may conclude as shown in FIG. 3.

Accordingly, the manufacturing system 400 and the method 300 of manufacturing of the present disclosure presents various advantages. The stator assembly 108 is assembled in a highly efficient and convenient fashion. Wire 214 for the windings 206 may be provided via the outer diameter openings 490 to reduce manufacturing time and improve accuracy. The stator assembly 108 may be manufactured progressively in various constructions 480, 482, 484, and these constructions may be robust and built to high tolerances to ensure that the stator assembly 108 is well-built. Additionally, the stator assembly 108 may include relatively few parts. Additionally, the method 300 may be completed automatically, and the manufacturing system 400 may include a number of automated components for improved manufacturing efficiency and high repeatability.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment of the present disclosure. It is understood that various changes may be made in the function and arrangement of elements described in an exemplary embodiment without departing from the scope of the present disclosure as set forth in the appended claims.

What is claimed is:

1. A method of manufacturing a stator assembly for an electrified rotary system comprising:
   attaching a first tooth and a second tooth to an inner support to define a first construction, the first tooth and the second tooth extending radially away from the inner support in the first construction;
   attaching a winding about the first tooth of the first construction to define a second construction;
   applying, with a fixture, a preload at a joint between the inner support and the first tooth of the second construction; and
   attaching an outer support to a first outer radial end of the first tooth and to a second outer radial end of the second tooth while applying the preload to define a third construction.

2. The method of claim 1, wherein attaching the first tooth and the second tooth includes defining an outer diameter opening of the first construction, the outer diameter opening defined between the first tooth and the second tooth in a circumferential direction; and
   wherein attaching the winding includes moving a conductive member radially into the outer diameter opening to attach the conductive member to the first tooth.

3. The method of claim 1, wherein attaching the first tooth to the inner support includes inserting a first inner radial end of the first tooth into an aperture of the inner support, the first inner radial end abutting an inner surface of the aperture at the joint.

4. The method of claim 1, wherein the first tooth includes a flange; and
   wherein attaching the first tooth to the inner support includes inserting the flange within an undercut channel of the aperture.

5. The method of claim 1, wherein attaching the outer support to the first outer radial end of the first tooth includes inserting the first outer radial end into an aperture of the outer support.

6. The method of claim 5, wherein the first tooth includes a flange; and
   wherein attaching the outer support to the first outer radial end of the first tooth includes inserting the flange within an undercut channel of the aperture.

7. The method of claim 1, wherein applying the preload includes applying, with the fixture, a radial preload at the joint that forces the first tooth inward radially toward the inner support.

8. The method of claim 7, wherein the fixture includes a base and an engagement member that is supported by the base;
   further comprising engaging the engagement member with the first tooth to push the first tooth radially inward toward the inner support and apply the preload.

9. The method of claim 8, wherein the fixture further comprises an adjustment member configured to selectively adjust the preload; and
   further comprising adjusting, with the adjustment member, the preload applied by the engagement member on the first tooth.

10. The method of claim 8, wherein the engagement member is configured to engage the first outer radial end of the first tooth to apply the preload.

11. The method of claim 1, further comprising integrally attaching the outer support to the first tooth and the second tooth.

12. The method of claim 11, wherein integrally attaching the outer support to the first tooth and the second tooth includes at least one of welding and brazing the outer support to the first tooth and the second tooth.

13. A manufacturing system for manufacture of a stator assembly for an electrified rotary system, the manufacturing system comprising:
- at least one attachment system;
- a winding system; and
- a fixture;
- the at least one attachment system configured to attach a first tooth and a second tooth to an inner support to form a first construction, the first tooth and the second tooth extending radially away from the inner support in the first construction;
- the winding system configured to attach a winding about the first tooth of the first construction to form a second construction;
- the fixture configured to apply a preload at a joint between the inner support and the first tooth of the second construction; and
- the at least one attachment system configured to attach an outer support to a first outer radial end of the first tooth and to a second outer radial end of the second tooth while applying the preload to define a third construction.

14. The manufacturing system of claim 13, wherein the first construction includes an outer diameter opening that is defined between the first tooth and the second tooth in a circumferential direction; and
- wherein the winding system is configured to attach the winding by moving a conductive member radially into the outer diameter opening to attach the conductive member to the first tooth.

15. The manufacturing system of claim 13, wherein the first construction includes a first inner radial end of the first tooth that is received within an aperture of the inner support, the first inner radial end abutting an inner surface of the aperture at the joint.

16. The manufacturing system of claim 15, wherein the first tooth includes a flange; and
- wherein the at least one attachment system is configured to insert the flange within an undercut channel of the aperture.

17. The manufacturing system of claim 13, wherein the first outer radial end of the first tooth is received within an aperture of the outer support in the third construction.

18. The manufacturing system of claim 17, wherein the first tooth includes a flange; and
- wherein the at least one attachment system is configured to insert the flange within an undercut channel of the aperture.

19. The manufacturing system of claim 13, where the fixture is configured to apply a radial preload at the joint that forces the first tooth inward radially toward the inner support.

20. A method of manufacturing an e-charger for an engine system, the method comprising:
- attaching a first tooth and a second tooth to an inner support to define a first construction, the first tooth and the second tooth extending radially away from the inner support in the first construction;
- attaching a winding about the first tooth of the first construction to define a second construction;
- applying, with a fixture, a radial preload at a joint between the inner support and the first tooth of the second construction;
- attaching an outer support to a first outer radial end of the first tooth and to a second outer radial end of the second tooth while applying the preload to define a third construction;
- installing the third construction as a stator assembly within an e-charger, the stator assembly configured to drive a rotor assembly of the e-charger in selective rotation about an axis.

* * * * *